United States Patent
Oh et al.

(10) Patent No.: US 7,498,102 B2
(45) Date of Patent: Mar. 3, 2009

(54) NONAQUEOUS LIQUID ELECTROLYTE

(76) Inventors: Bookeun Oh, 2844 Windsor Dr. #106, Lisle, IL (US) 60532; Khalil Amine, 6813 Penner Pl., Downers Grove, IL (US) 60516; Yoo-Eup Hyung, 2745 Bristol Dr. #309, Lisle, IL (US) 60532; Donald R. Vissers, 611 Clover Ct., Naperville, IL (US) 60540; Hisashi Tsukamoto, 28445 Via Joyce Dr., Saugus, CA (US) 91350

( * ) Notice: Subject to any disclaimer, the term of this patent is extended or adjusted under 35 U.S.C. 154(b) by 1021 days.

(21) Appl. No.: 10/167,940

(22) Filed: Jun. 12, 2002

(65) Prior Publication Data

US 2003/0180625 A1    Sep. 25, 2003

Related U.S. Application Data

(63) Continuation-in-part of application No. 10/104,352, filed on Mar. 22, 2002, now abandoned.

(51) Int. Cl.
 *H01M 6/16* (2006.01)
(52) U.S. Cl. .................... 429/313; 429/317; 429/347; 429/307
(58) Field of Classification Search ................. 429/300, 429/313, 317, 307, 347; 252/62.2
See application file for complete search history.

(56) References Cited

U.S. PATENT DOCUMENTS

| | | |
|---|---|---|
| 3,172,899 A | 3/1965 | Bailey |
| 3,530,159 A | 9/1970 | Guinet et al. |
| 3,734,876 A | 5/1973 | Chu |
| 4,259,467 A | 3/1981 | Keogh et al. |
| 4,830,939 A | 5/1989 | Lee et al. |
| 4,849,856 A | 7/1989 | Funari et al. |
| 4,908,283 A | 3/1990 | Takahashi et al. |
| 5,037,712 A | 8/1991 | Shackle et al. |

(Continued)

FOREIGN PATENT DOCUMENTS

EP        0 450 981 A1    10/1991

(Continued)

OTHER PUBLICATIONS

International Search Report, dated Jul. 11, 2003, received In relation to Application No. PCT/US03/02128.

(Continued)

*Primary Examiner*—Tracy Dove
(74) *Attorney, Agent, or Firm*—Guerilovich Dodd & Lindsey, LLP (57) ABSTRACT

Disclosed is a nonaqueous and nonvolatile liquid type polymeric electrolyte comprising poly(siloxane-g-ethylene oxide). This electrolyte provides significant safety and stability. The present invention solves the problems of volatility, flammability and chemical reactivity of lithium ion type electrolytes. The disclosed electrolyte exhibits excellent stability, conductivity and low impedance characteristics. The electrolyte comprises a new class of structural siloxane polymers with one or more poly(ethylene oxide) side chains. The inorganic siloxanes comprising the main backbone of the copolymers are thermally very stable and resistant to decomposition by heat. Because the main chain of the disclosed class of electrolytes is an Si—O linkage, initiation of the combustion cycle is inhibited or prevented.

24 Claims, 6 Drawing Sheets

U.S. PATENT DOCUMENTS

| | | | |
|---|---|---|---|
| 5,112,512 A | 5/1992 | Nakamura | |
| 5,272,021 A | 12/1993 | Asai et al. | |
| 5,300,375 A | 4/1994 | Chaloner-Gill | |
| 5,362,493 A | 11/1994 | Skotheim et al. | |
| 5,419,984 A | 5/1995 | Chaloner-Gill et al. | |
| 5,475,127 A | 12/1995 | Klein et al. | |
| 5,538,812 A * | 7/1996 | Lee et al. ............... | 429/307 |
| 5,593,787 A | 1/1997 | Dauth et al. | |
| 5,609,974 A | 3/1997 | Sun | |
| 5,633,098 A | 5/1997 | Narang et al. | |
| 5,690,702 A | 11/1997 | Skotheim et al. | |
| 5,700,300 A | 12/1997 | Jensen et al. | |
| 5,731,104 A | 3/1998 | Ventura et al. | |
| 5,753,389 A | 5/1998 | Gan et al. | |
| 5,772,934 A | 6/1998 | MacFadden | |
| 5,882,812 A | 3/1999 | Visco et al. | |
| 5,885,733 A * | 3/1999 | Ohsawa et al. ............. | 429/309 |
| 5,919,587 A | 7/1999 | Mukherjee et al. | |
| 5,961,672 A | 10/1999 | Skotheim et al. | |
| 6,013,393 A * | 1/2000 | Taniuchi et al. ............. | 429/303 |
| 6,015,638 A | 1/2000 | Ventura et al. | |
| 6,124,062 A | 9/2000 | Horie et al. | |
| 6,168,885 B1 | 1/2001 | Narang et al. | |
| 6,181,545 B1 | 1/2001 | Amatucci et al. | |
| 6,245,465 B1 * | 6/2001 | Angell et al. ............... | 429/340 |
| 6,248,481 B1 | 6/2001 | Visco et al. | |
| 6,252,762 B1 | 6/2001 | Amatucci | |
| 6,268,088 B1 * | 7/2001 | Oh et al. .................... | 429/303 |
| 6,337,383 B1 | 1/2002 | West et al. | |
| 6,447,952 B1 | 9/2002 | Speigel et al. | |
| 6,482,912 B2 | 11/2002 | Boudjouk et al. | |
| 6,495,287 B1 | 12/2002 | Kolb et al. | |
| 6,573,009 B1 | 6/2003 | Noda et al. | |
| 6,610,109 B2 | 8/2003 | Noh | |
| 6,653,015 B2 | 11/2003 | Yoshida et al. | |
| 6,872,493 B2 * | 3/2005 | Yamada et al. ............. | 429/313 |
| 6,887,619 B2 * | 5/2005 | West et al. .................. | 429/189 |
| 2002/0028388 A1 | 3/2002 | Lee | |
| 2002/0051911 A1 | 5/2002 | Okada | |
| 2002/0192554 A1 | 12/2002 | Woo et al. | |
| 2003/0036003 A1 | 2/2003 | Shchori et al. | |
| 2003/0099884 A1 | 5/2003 | Chiang et al. | |
| 2003/0104282 A1 | 6/2003 | Xing et al. | |
| 2003/0180624 A1 | 9/2003 | Oh et al. | |
| 2003/0198869 A1 | 10/2003 | West et al. | |
| 2003/0198870 A1 * | 10/2003 | Wariishi et al. ............ | 429/313 |
| 2004/0096746 A1 * | 5/2004 | Wietelmann et al. ........ | 429/324 |
| 2004/0197665 A1 * | 10/2004 | Amine et al. ............... | 429/313 |
| 2004/0197668 A1 | 10/2004 | Jung et al. | |
| 2004/0214090 A1 * | 10/2004 | West et al. .................. | 429/311 |

FOREIGN PATENT DOCUMENTS

| | | |
|---|---|---|
| EP | 0 525 728 A1 | 2/1993 |
| EP | 0 581 296 A2 | 2/1994 |
| EP | 0 581 298 A3 | 2/1994 |
| EP | 0 922 049 B1 | 2/1998 |
| EP | 0 932 215 A1 | 1/1999 |
| EP | 0 798 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034661 | 2/1982 |
| JP | 57-034662 | 2/1982 |
| JP | 57-080670 | 5/1982 |
| JP | 57-111957 | 7/1982 |
| JP | 57-176669 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-208169 A2 | 9/1987 |
| JP | 63-010466 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 60-052893 A2 | 7/1992 |
| JP | 05-036441 | 2/1993 |
| JP | 05-290816 | 11/1993 |
| JP | 07-320782 | 12/1995 |
| JP | 08-078053 A2 | 3/1996 |
| JP | 09-309544 | 11/1997 |
| JP | 11-214032 A2 | 1/1998 |
| JP | 11--302384 A2 | 4/1998 |
| JP | 10-172615 A2 | 6/1998 |
| JP | 11-185804 | 7/1999 |
| JP | 11-238523 | 8/1999 |
| JP | 11-302383 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-222939 A2 | 8/2000 |
| JP | 2000-277152 A2 | 10/2000 |
| JP | 2001-068116 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-053936 A2 | 2/2002 |
| JP | 2002-151150 A2 | 5/2002 |
| JP | 2002 155142 A2 | 5/2002 |
| JP | 2002-298913 A2 | 10/2002 |
| JP | 2002-343440 A2 | 11/2002 |
| JP | 2003-002974 A2 | 1/2003 |
| WO | WO 96/21853 | 7/1996 |
| WO | WO 98/07729 A1 | 2/1998 |
| WO | WO 00/00495 A1 | 1/2000 |
| WO | WO 00/08654 | 2/2000 |
| WO | WO 00/25323 | 5/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 03/038970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

International Search Report, dated Jul. 11, 2003, received in relation to Application No. PCT/US03/08740.

International Search Report, dated Jul. 16, 2003, received in relation to Application No. PCT/US03/08779.

D. Fish et al., Polymer Electrolyte Complexes of $ClO_4$ and Comb Polymers of Siloxane with Olige-oxyethylene Side Chains, British Polymer Journal, 1988, 281-288, 20, 3.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, 1990, 1260-1262, 63, 4.

H. Allcock et al., Polyphosphazenes Bearing Branched and Linear Oligoethyleneoxy Side Groups as Solid Solvents for Ionic Conduction, Macromolecules, 1996, 7544-7552, 29.

J. Blackwell et al., $B(C_6F_5)_3$-Catalyzed Silation of Alcohols: A Mild, General Method for Synthesis for Silyl Ethers, Journal of Organic Chemistry, 1999, 4887-4892, 64.

W. Xu et al., Structures of Orthoborate Anions and Physical Properties of Their Lithium Salt Nonaqueous Solutions, Journal of the Electrochemical Society, 2003, 1-0, 150(1).

Nicodom Ltd., Inorganic Library of FT-IR Spectra Inorganics II—Boron Compounds, homepage, website http://www.ftir.cz/INLIB2.html and http://www.ftir.cz/home$_{13}$ page_of_nicodom_sro.htm., no date.

W. Xu et al., Ionic Conductivity and Electrochemical Properties of Lithium Orthoborate Salts, http://www.electrochem.org/meetings/past/200/abstracts/symposia/bla/0107.pdf, United States., no date.

T. Fujii et al., Application of LiBOB as an Electrolyte Salt for 4 V Class Lithium Ion Rechargeable Cells, whttp://www2.electrochem.org/cgi-bin/abs?mtg=202&abs=0203, United States., no date.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, 2002, 1224-1226, vol. 296, www.sciencemag.org.

M. Armand, New Electrode Material, Proceedings of the NATO Sponsored Advanced Study Institute on Fast Ion Transport in Solids, Solid State Batteries and Devices, 1972, Belgirate, Italy.

D. Fenton et al., Complexes of Alkali Metal Ions with Poly(Ethylene Oxide), Polymer, 1973, 589, 14.

E. Tsuchida et al., Conduction of Lithium Ions in Polyvinylidene Fluoride and its Derivates-l, Electrochimica Acta, 1983, 591-595, 28(5).

L. Hardy et al., Chloride Ion Conductivity in a Plasticzed Quaternary Ammonium Polymer, Macromolecules, 1984, 975-977, 17.

P. Blonsky et al., Polyphosphazene Solid Electrolytes, Journal of American Chemical Society, 1984, 6854-6855, 106.

I. Kelly et al., Poly(Ethylene Oxide) Electrolytes for Operation at Near Room Temperature, Journal of Power Sources, 1985, 13-21, 14.

D. Bannister et al., A Water-Soluble Siloxane: Poly(ethylene glycol) Comb Poymer, Journal of Polymer Science: Polymer Letters Edition, 1985, 465-467, 23.

D. Fish et al., Conductivity of Solid Complexes of Lithium Perchlorate with Poly{[w-methoxyhexa(oxyethylene)ethoxy]methylsiloxane} $^{a)}$, Makromol. Chem., Rapid Commun., 1986, 115-120, 7.

P. Hall et al. Ion Conductivity in Polysiloxane Comb Polymers With Ethylene Glycol Teeth, Polymer Communications, 1986, 3 pages, 27.

R. Spindler et al., Investigations of a Siloxane-Based Polymer Electrolyte Employing $^{13}$C, $^{29}$Si, $^{7}$Li, and $^{23}$Na Solid State NMR Spectroscopy, Journal of American Chemical Society, 1988, 3036-3043, 110.

R. Spindler et al., Synthesis NMR Characterization, and Electrical Properties of Siloxane-Based Polymer Electrolytes, Macromolecules, 1988, 648-654, 21.

S. Ganapathiappan et al.,. A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

S. Ganapathiappan et al., Synthesis, Characterization and Electrical Response of Phosphazene Polyelectrolytes, Journal of America Chemical Society, 1989, 4091-4095, 111.

L. Dominey et al., Thermally Stable Lithium Salts for Polymer Electrolytes, Electrochimica Acta, 1992, 1551-1554, 37(9).

G. Zhou et al., Solvent-Free Cation-Conduction Polysiloxane Electrolytes with Pendant Oligo(oxyethylene) and Sulfonate Groups, Macromolecules, 1993, 2202-2208, 26.

F. Alloin et al., Triblock Copolymers and Networks Incorporating Oligo (Oxyethylene) Chains, Solid State Ionics, 1993, 3-9, 60.

C. St. Pierre et al., Lithium-Metal-Polymer Battery for Electric Vehicle and Hybrid Electric Vehicle Applications, www.avestor.com/en/automotive.html, info@avestor.com, 1993, 11 pages.

M. Gauthier et al., Large Lithium Polymer Battery Development The Immobile Solvent Concept, Journal of Power Sources, 1995, 163-169, 54.

S. Kohama et al., Alcoholysis of Poly(methylhydrogensiloxane), Journal of Applied Sciences, 1997, 21, 863-867.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

M. Furlani et al., Time Resolved Luminescence and Vibrational Spectroscopic Studies on Complexes of Poly(Ethylene Oxide) Oligomers and Eu(TFSI)$_3$ Salt, 11$^{th}$ International Conference on Solid State Ionics, 1997, 10 pages.

K. Abraham et al., Highly Conductive PEO-Like Polymer Electrolytes, Journal of Chemical Materials, 1997, 1978-1988,9(9).

Z. Wang et al., Thermal, Electrochemical, and Spectroscopic Characterizations of Hyperbranched Polymer Electrolyte, Journal of Electrochemical Society, 1999, 2209-2215, 146(6).

R. Hopper et al., A Highly Conductive Solid-State Polymer Electrolyte Based on a Double: Comb Polysiloxane Polymer with Oligo(Ethylene Oxide) Side Chains, Organometallics, American Chemical Society, 1999, 3249-3251, 18(17).

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol)$_n$ Dimethacrylates—Thermal, Mechanical and Electrochemical Properties in Relationship to the Network Structure, Polymer, 2000, 3821-3836, 41.

X. Hou et al., Novel Interpenetrating Polymer Network Electrolytes, Polymer, 2001, 4181-4188, 42.

R. Hooper et al., Highly Conductive Siloxane Polymers, Macromolecules, 2001, 931-936,34.

C.F. Rome, The Unique Properties of Silicone at the Service of the Petroleum Industry, Hydrocarbon Asia, 2001, 42-49, 'www.hcasia.safan.com/mag/may-jun01/Tech-Silicone.pdf'.

N. Katayama et al., Thermal Stability of Propylene Carbonate and Ethylene Carbonate-Propylene Carbonate-Based Electrolytes for Use in Li Cells, Journal of Power Sources, 2002, 321-326, 109(2), http://www.sciencedirect.com/web-editions.

C. Letourneau et al., Progress in Lithium-Metal-Polymer Battery System for Electric Vehicles, www.avestor.com/en/automotive.html, info@avestor.com, Canada, 1-10, no date.

F. Gray, Polymer Electrolytes, RSC Materials Monographs, UK, 46-49, no date.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, 405-406, no date.

W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.

Y. Kang et al., Solid Polymer Electrolytes Based on Cross-Linked Polysiloxane-g-oligo(ethylene oxide): Ionic Conductivity and Electrochemical Properties, Journal of Power Sources 119-121 (Jun. 1, 2003), pp. 448-453.

International Search Report, dated May 1, 2003, received in relation to Application No. PCT/US03/02127.

B. Oh et al., New Electrolyte Network-Type Siloxane Polymer Electrolyte, Electrochemical and Solid State Letters, 2002, E59-E61, 5(11), The Electrochemical Society, Inc.

International Search Report, dated Sep. 12, 2003, received in relation to Application No. PCT/US03/08784.

International Search Report, dated Oct 9, 2003, received in relation to Application No. PCT/US03/08783.

International Search Report, dated Oct. 9, 2003, received in relation to Application No. PCT/US03/08779.

R. Zhang et al., Modification of Polymethylhydrosiloxane by Dehydrocoupling Reactions Catalyzed by Transition Metal Complexes: Evidence for the Preservation of Linear Siloxane Structures, Silicon Chemistry, 2003, vol. 2, 271-277.

Z. Zhang et al., Network-Type Ionic Conductors Based on Oligoethyleneoxy-Functionalized Pentamethylcyclopentasiloxanes, Macromolecules, 2005, vol. 38, 5714-5720.

Z. Zhang et al., Synthesis and Ionic Conductivity of Cyclosiloxanes with Ethyleneoxy-Containing Substituents, Chem. Mater., 2005, vol. 17, 5646-5650.

M. UE. Recent Technological Trend In Electrolyte Materials for Li-Ion Batteries, Abstract 31, International Meeting on Lithium Batteries (IMLB 12), 2004, The Electrochemical Society, Inc.

* cited by examiner

NONAQUEOUS LIQUID ELECTROLYTE

REFERENCE TO PRIOR FILED APPLICATIONS

This application is a Continuation-in-Part of application Ser. No. 10/104,352 filed Mar. 22, 2002 now abandoned titled "Solid Polymer Electrolyte and Method of Preparation" to Oh et al., the disclosure of which is incorporated herein by reference.

GOVERNMENT LICENSE RIGHTS

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002.

FIELD OF THE INVENTION

The present invention relates to electrochemical storage devices containing a nonaqueous electrolyte with high ionic conductivity and nonvolatile characteristics. More particularly, the present invention relates to liquid type polymeric electrolytes that are superior in ionic conductivity, thermal stability and safety to most of those currently being used in lithium-ion cells today.

BACKGROUND OF THE INVENTION

The demand for lithium secondary batteries to meet high power and high-energy system applications has resulted in substantial research and development activities to improve their safety, as well as performance. As the world becomes increasingly dependent on portable electronic devices, and looks toward increased use of electrochemical storage devices for vehicles, power distribution load leveling and the like, it is increasingly important that the safety of such devices be paramount, especially as these devices are being used in such environments as airliners and space vehicles. The effort to date has included research in flame-retardants, solid polymer electrolytes and new electrolyte concepts with improved thermostability. Thus, the development of highly conductive electrolytes, free of any problems associated with volatile and combustible solvents, is of paramount importance. Electrolytes based on polymeric structures have basically better heat and chemical resistance than conventional organic carbonate-based electrolytes and can thus reduce many chemical side reactions occurring in lithium secondary batteries. Although, polymeric based electrolytes have many advantages over carbonate solvent based electrolytes, their application in lithium secondary batteries has been limited due to their low ionic conductivity, usually below $10^{-5}$ S/cm at room temperature.

To solve this problem, new electrolyte concepts are needed. The new electrolytes should be nonvolatile materials that have excellent electrochemical properties, such as high ionic conductivity of over $10^{-4}$ S/cm at room temperature and wide electrochemical stability windows of over 4.5 V (based on lithium metal).

Accordingly, the present inventors have developed a new type of ionically conductive electrolyte based on various polymeric structures, especially having a poly(siloxane-g-ethylene oxide) composition which overcomes the above mentioned problems of volatility, flammability and chemical reactivity inside of the lithium battery. The proposed liquid type poly(siloxane-g-ethylene oxide) materials also have an excellent electrochemical stability window and favorable room temperature ionic conductivity.

Carbonate solvents, such as ethylene carbonate and ethylmethyl carbonate used for conventional lithium battery electrolytes can easily burn from low temperature sources of ignition and generate flame, carbon dioxide and $H_2O$ during thermal degradation. This is a critical problem in high capacity battery applications like lithium batteries for electric vehicles (EV) and satellites. Polymeric materials, however, usually have a somewhat different combustion mechanism than the carbonates. The initial stage of a fire occurs when a heat source decomposes the polymeric materials to flammable volatile products. Thus, for continuous burning to occur, (a) the application of heat must be sufficient to decompose the polymer, (b) the temperature must be sufficient to ignite the products of decomposition, and (c) the amount of heat transferred from the flame back to the polymer must be sufficient to maintain the cycle. In general, polymeric materials are more thermally stable than low molecular weight chemicals like the organic carbonates because they are not volatile and are vaporized at much higher temperatures.

The present inventors have carefully considered the combustion mechanisms of polymeric materials and concluded that to stop the propagation of the burning cycle one needed to develop new polymer materials that are thermally more stable and capable of dissolving the lithium salts to prepare electrolytes for electrochemical devices such as lithium batteries and/or capacitors. The present inventors have developed new structural siloxane polymers with one or more poly(ethylene oxide) side chains. Siloxanes are very thermally stable and are decomposed by heat with difficulty. Only a few flammable by-products are formed during the thermal decomposition of such polymers because their main chain is a Si—O linkage. Thus, its presence in the proposed polymers will delay the initiation of the combustion cycle.

Due to the merits of siloxane-poly(ethylene oxide) graft copolymers, substantial research has been done. See, for example, U.S. Pat. No. 5,112,512 to Nakamura and U.S. Pat. No. 6,124,062 to Horie et al. also describing siloxane-poly (ethylene oxide) graft copolymers (as a polymeric electrolyte material. The '512 patent discloses a crosslinked polymer electrolyte based on the graft copolymers, but its ionic conductivity is too low for room temperature applications. The '062 patent discloses direct use of siloxane-poly(ethylene oxide) grafted copolymers as a liquid for a lithium battery electrolyte with ionic conductivity of around $10^{-4}$ S/cm at ca. 25° C. (See General Formula I). The conductivity of the material disclosed in the '062 patent is disadvantageously low. In addition, the cost of such material is relatively high. The present inventors have discovered a much improved material with higher conductivity and lower cost.

General formula (I) (as disclosed in the '062 patent):
Error! Objects cannot be created from editing field codes.
wherein R is alkyl group.

The present inventors developed an improved liquid state siloxane polymer with one or more poly(ethylene oxide) side chains to ensure thermal stability and electrochemical properties. Poly(ethylene oxides) (PEO) in poly(siloxane-g-ethylene oxide) materials of this invention (see general formula II) are directly bonded to a Si atom. Poly(siloxane-g-ethylene oxide) materials of the present invention are easily synthesized through a simple dehydrocoupling reaction with simple metal carbonate based catalysts and the cost for synthesis of poly(siloxane-g-ethylene oxide) of this invention is much lower than the cost of synthesis of general formula (I) with a propylene spacer between siloxane and PEO. The present inventors also control the viscosity of the materials to get high ionic conductivities of around $10^{-3}$ S/cm at room temperature.

General formula (II):

where R and R" are alkyl groups and R' is hydrogen or alkyl group.

As compared to the material disclosed in the '062 patent, ionic conductivity is improved by changing the chemical structure of siloxane, that is, directly grafting ethylene oxide onto Si atom without any alkyl carbon spacer between them. Changing the structure in this way increases hydrophilicity and solubility, leading to higher conductivity.

OBJECTIVES OF THE INVENTION

A primary objective of the present invention is to provide a safe liquid electrolyte for use in lithium ion type cells and allied devices such as super capacitors and hybrid devices. Specifically, a primary objective is to reduce or eliminate problems associated with volatility, flammability and chemical reactivity of liquid electrolytes.

A further objective of the invention is to provide a lithium-based secondary battery, capacitor or hybrid device with enhanced safety and excellent performance characteristics by use of the present polymeric electrolyte.

SUMMARY OF THE INVENTION

Accordingly, the present invention relates to lithium-based secondary batteries with a nonaqueous and nonvolatile polymeric electrolyte with high room temperature ionic conductivity with enhanced safety.

The invention also relates to nonaqueous and nonvolatile polymeric electrolytes processing controlled viscosity for the high-energy lithium secondary battery applications, especially for electric vehicles and satellite applications.

To fulfill the above objectives, the nonaqueous and nonvolatile polymeric electrolyte solutions in the present invention is prepared by using the compositions which comprise poly(siloxane-g-ethylene oxide) in a liquid state with proper viscosity and a dissolved lithium salt.

DETAILED DESCRIPTION OF THE INVENTION

The electrolyte solution of the present invention comprises siloxane polymers with one or more poly(ethylene oxide) as a side chain (see general formula II above). The inorganic siloxane main body ensures flame-retardancy and chemical stability, and poly(ethylene oxide) side chains give ionic conducting phases. A poly(ethylene oxide) group is directly grafted to silicon atoms in the siloxane polymer. The poly(siloxane-g-ethylene oxides) of the present invention are easily synthesized through simple dehydrogenation reactions to avoid problems that come from the use of metal catalysts such as platinum.

The poly(siloxane-g-ethylene oxide) easily dissolves lithium salt and has enough flexibility to transport lithium ions. Through the viscosity control of the poly(siloxane-g-ethylene oxide), the polymeric electrolyte solution provides excellent ionic conductivity of around $10^{-3}$ S/cm at room temperature.

The salt to be used in the present invention is not particularly limited, as long as it serves as an electrolyte for a lithium secondary battery, capacitor, or other electrochemical device. Examples of specific lithium salts include, but are not limited to, $LiClO_4$, $LiBF_4$, $LiAsF_6$, $LiPF_6$, $LiCF_3SO_3$, $Li(CF_3SO_2)_2N$, $LiC(CF_3SO_2)_3$, $LiN(SO_2C_2F_5)_2$, lithium alkyl fluorophosphates, and mixtures thereof. Other salts may be used, particularly alkali metal salts or quaternary ammonium salts having an anion selected from the group consisting of: $ClO_4^-$, $BF_4^-$, $AsF_6^-$, $PF_6^-$, $CF_3SO_3^-$, $(CF_3SO_2)_2N^-$, $(CF_3SO_2)_3C^-$, $(C_2F_5SO_2)_2N^-$, $PF_3(C_2F_5)_3^-$, $PF_3(CF_3)_3^-$, and $B(C_2O_4)_2^-$.

Further examples (without the intent to limit the scope of the invention) found to be beneficial are lithium bis(chelato) borates having from five to seven membered rings as follows:

Five-membered rings

Where R is H or an alkyl group.

Six-membered ring     Seven-membered ring

The oxygen versus Li ratio (doping level) is preferably 5:1 to 50:1. If the doping level is greater than 50:1, the ionic conductivity of the resulting polymeric electrolyte is undesir- ably decreased because of the number of ions present in the solid polymer electrolyte. If the doping level is smaller than 5:1, the lithium salt is not sufficiently dissociated in the resulting polymeric electrolyte and the association of lithium ion reduces the ionic conductivity. Preferably, the average molecular weight of the poly(siloxane-g-ethylene oxide) should not exceed 20,000 g/mol. The dynamic viscosity of the poly(siloxane-g-ethylene oxide) is best in the range of 200 cPs, should preferably not exceed 1,000 cPs to 2,000 cPs, and should never exceed 10,000 cPs.

The present invention covers both polymeric electrolytes as well as the lithium secondary batteries that use them in the same way that the carbonate based electrolytes are applied in the state-of-the-art Li-ion batteries today. A lithium secondary battery with the polymeric electrolyte solution of this invention as a conducting medium can be fabricated by injecting the polymeric electrolyte solution into a spiral wound cell or prismatic type cell. It can be also coated onto the surface of electrodes and assembled with a porous separator to fabricate single or multi-stacked cells that are packaged with plastic pouches. Similarly, the electrolyte of the present invention may be used in ultra capacitors (also known as super capacitors) and hybrid devices incorporating aspects of batteries and capacitors.

In situ tests: Type 2032 button cells were assembled for the evaluation of cell performance with a MAG-10 anode, and $LiNi_{0.8}Co_{0.15}Al_{0.05}O_2$ as a cathode. Celgard® 2500 (microporous polypropylene membrane, available from CELGARD Inc.) was used as a separator. These cells contained MAG-10 graphite, with 8 wt % PVDF binder/poly(siloxane-g-3 ethylene oxide), doping level of 32:1 with LiTFSI, electrolyte/$LiNi_{0.8}Co_{0.15}Al_{0.05}O_2$, 8 wt % PVDF, 4 wt % SFG-6 graphite, and 4 wt % carbon black. The effective cell area was 1.6 cm². Charge and discharge rate were C/10. There was no degradation peak caused by the metal oxide up to 4.1V and the specific charge capacity was over 140 mAh/g.

Figure 1:
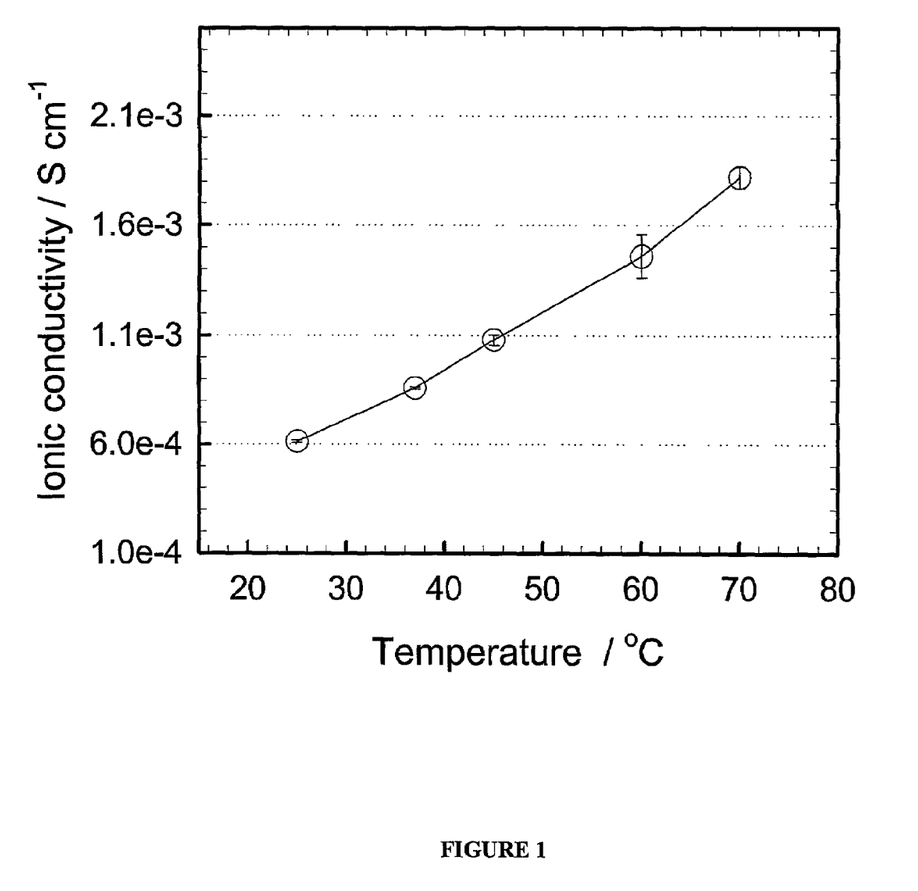
FIG. 1 is a trace of measured ionic conductivity vs. temperature for a cell made according to the present invention.

FIG. 1 shows the effect of temperature on the ionic conductivity of poly(siloxane-g-3 ethylene oxide) electrolyte (see general formula III). Poly(siloxane-g-3 ethylene oxide) and $Li(CF_3SO_2)_2N$ were mixed with a doping level of 32:1. The ionic conductivity of the polymeric electrolytes at temperatures ranging from 25 to 70° C. were measured from the AC impedance curves from type 2030 button cells assembled by injecting the polymeric electrolyte between two stainless steel discs with a glass filter (750 micron thick) to prevent short circuits. The measuring frequency range was from 1 MHz to 10 Hz.

General formula (III):

Poly(siloxane-g-3 ethylene oxide) electrolyte shows an excellent ionic conductivity of $8.6 \times 10^{-4}$ S/cm at 37° C.

Figure 2A:
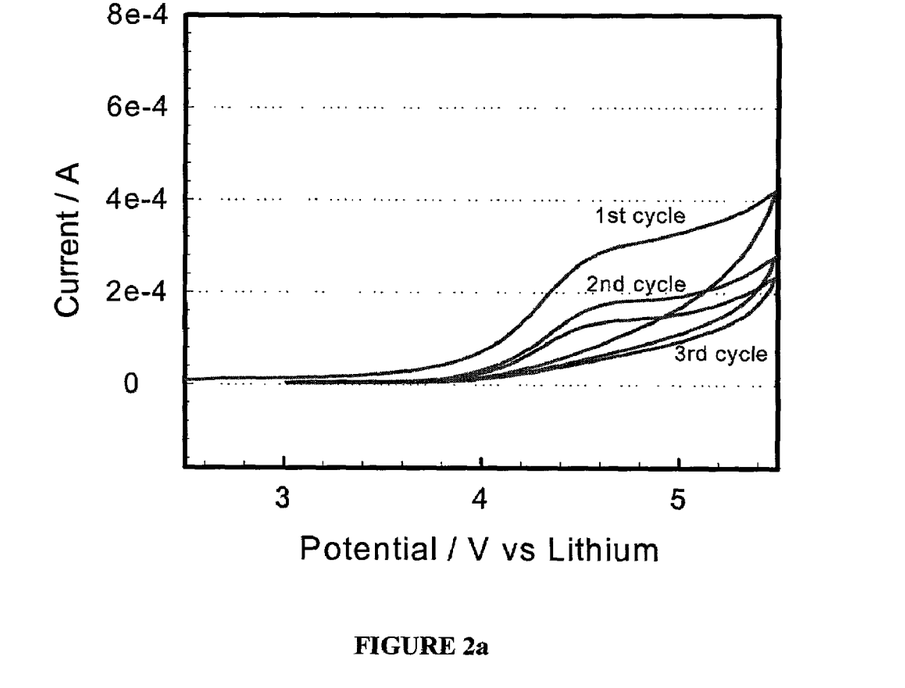
FIGS. 2a and 2b are traces of cyclic voltammetry measurements to determine electrochemical stability of samples made according to the present invention.
Figure 2B:
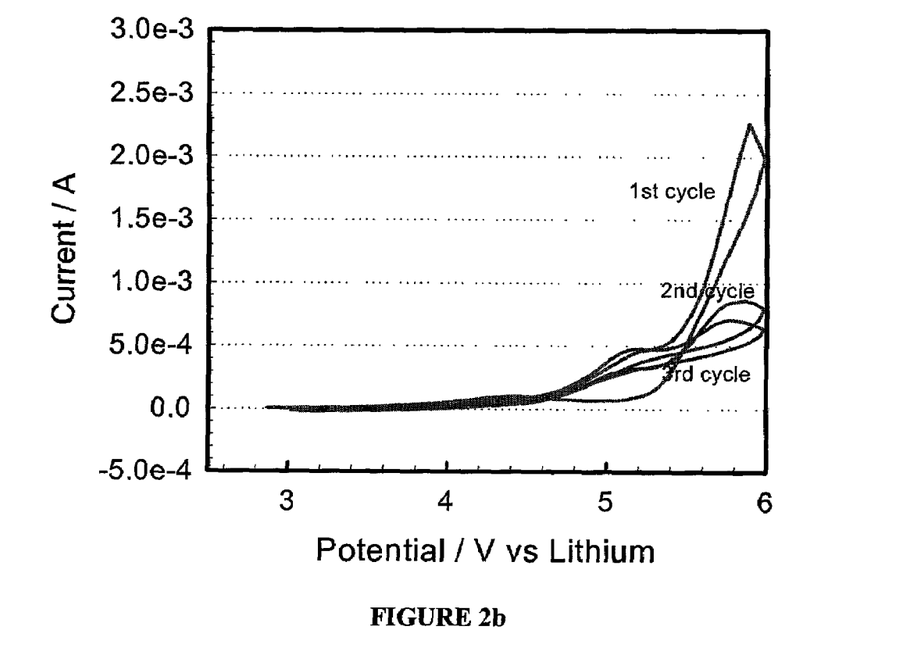

FIGS. 2a and 2b show the electrochemical stability of poly(siloxane-g-3 ethylene oxide) and poly(siloxane-g-7 ethylene oxide) (see general formula IV) electrolytes, respectively. Poly(siloxane-g-ethylene oxides) and $Li(CF_3SO_2)_2N$ were mixed with a doping level of 32:1. The electrochemical stability window of the polymer electrolytes were determined by cyclic voltammetry with type 2030 button cells assembled by sandwiching a glass filter containing the polymer electrolyte between a stainless steel disc as a working electrode and a lithium metal disc as a combined counter and reference electrode. These polymeric electrolytes were found to show excellent electrochemical stability windows over 0 to 4.5V (vs. Li) and only a minimal decomposition peak around 4.5V during the first anodic sweep. In the case of poly(siloxane-g-7 ethylene oxide), which is more stable, the stability window reaches ca. 5.5V.

General formula (IV)

Figure 3:
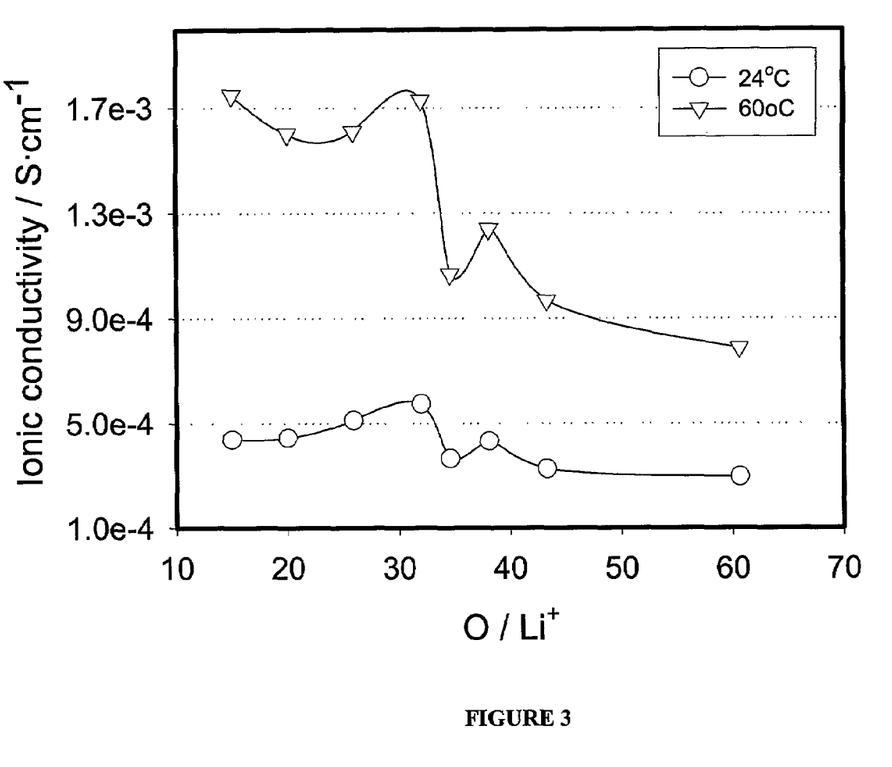
FIG. 3 is a trace of measured ionic conductivity showing the effect of doping level, on the ionic conductivity of poly(siloxane-g-3 ethylene oxide) electrolyte at two different temperatures.

FIG. 3 is a trace of measured ionic conductivity vs. doping level at two different temperatures (24° C. and 60° C.). These data show the effect of doping level, O vs. Li⁺, on the ionic conductivity of poly(siloxane-g-3 ethylene oxide) electrolyte (see general formula III). A doping level of 32:1 is an optimum formulation regardless temperature. In the case of doping level of 15:1, there is an improvement of ionic conductivity at 60° C. owing to the additional dissociation of lithium cluster formed at 24° C. A high concentration of lithium salt generally creates clusters at lower temperature, but can be dissociated a bit by increasing temperature.

Figure 4:
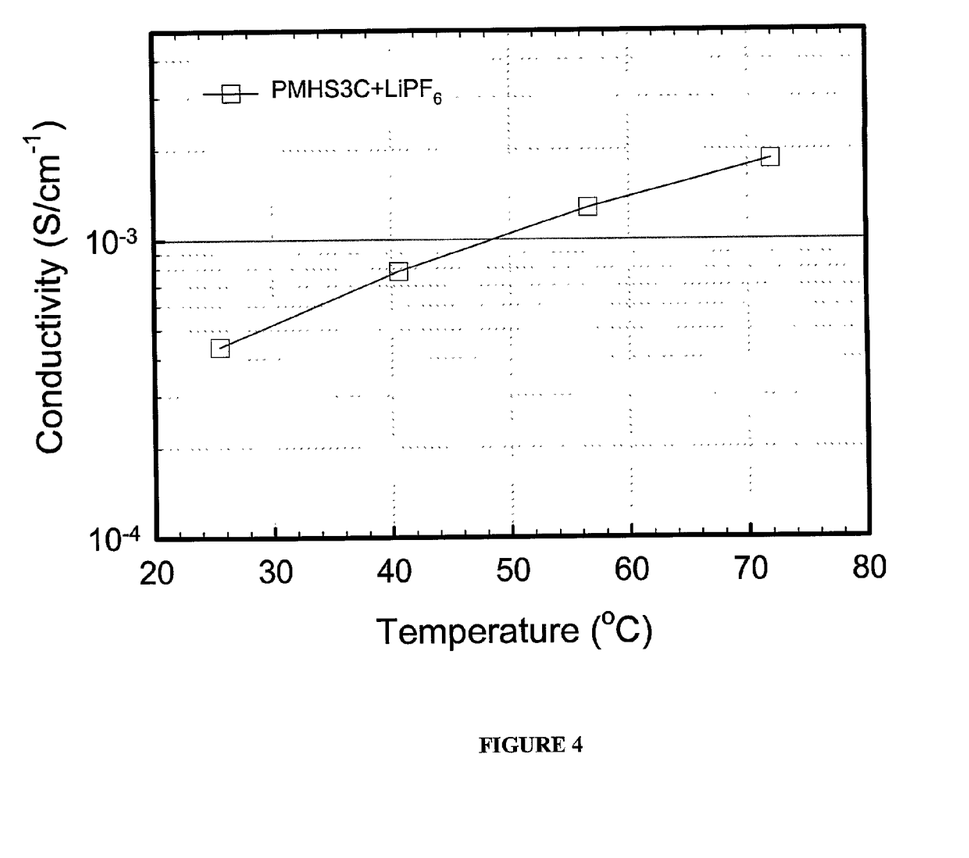
FIG. 4 is a trace of measured ionic conductivity of poly(siloxane-g-3 ethylene oxide) electrolyte with $LiPF_6$ in place of LiTFSI at a doping level of 32:1.

FIG. 4 shows the ionic conductivity of poly(siloxane-g-3 ethylene oxide) electrolyte with $LiPF_6$ in place of LiTFSI at a doping level of 32:1. Even though $LiPF_6$ has smaller anion than LiTFSI, the ionic conductivity values are similar to that shown in FIG. 1. This is due to the highly flexible structure of poly(siloxane-g-3 ethylene oxide). The highly flexible structure of the siloxane electrolyte of this invention can overcome the lack of plasticizing effect by the anion part of lithium salt. Poly(siloxane-g-3 ethylene oxide) has the additional advantage of increasing the variety of usable lithium salts over that of General formula (I) (as disclosed in the '062 patent), siloxane with alkyl carbon spacer between Si and polyethylene oxide. This comes from the fact that the rotation barrier of the Si—O bond is less than 0.2 kcal, but that of Si—$CH_3$ is 1.6 kcal (see, C. F. Rome, Hydrocarbon Asia, May/June (2001) 42-49).

Figure 5A:
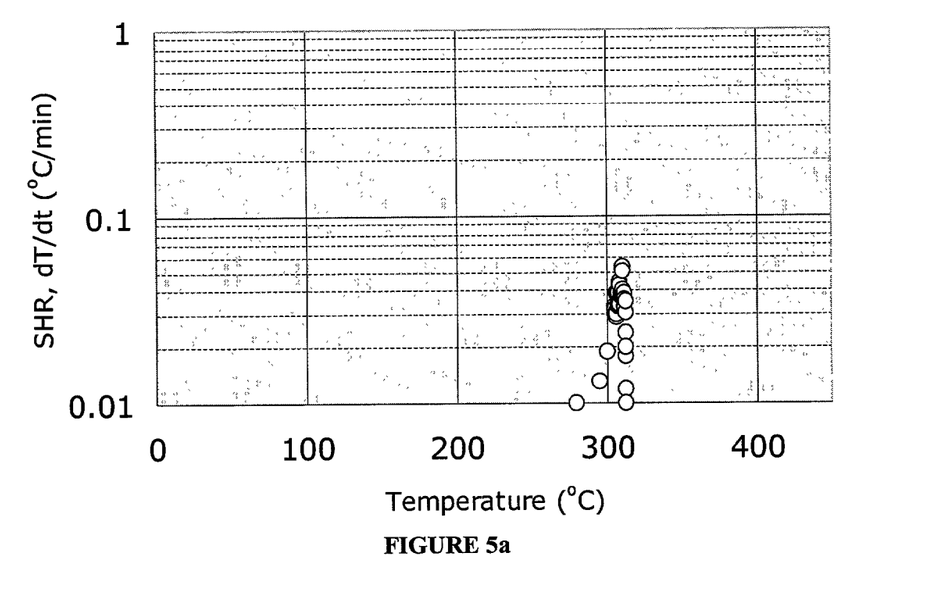
FIG. 5a is a data trace from accelerating rate calorimetry (ARC) tests of the electrolyte of the present invention.

FIG. 5(a) shows thermal stability of poly(siloxane-g-3 ethylene oxide) electrolyte at a doping level of 32:1 with $LiPF_6$, using accelerating rate calorimetry ("ARC"). A heat-wait-search sequence was applied. Sample weight for the test was 500 mg. Each sample was introduced in a 2¼"×¼" diameter stainless steel bomb for the ARC test.

ARC is more sensitive test method than differential scanning calorimetry ("DSC"). In a heat-wait-search sequence, ARC will search an exothermic reaction for 30 minutes at every 5° C. change from the starting temperature. In DSC, a 5 or 10° C./min heating rate is usually used and the sample quantity is only about 2 to 5 μL. In the case of some chemicals, the exothermic peak by DSC comes later than ARC due to its much faster scan rate than ARC.

Although solid $LiPF_6$ itself decomposes to $PF_5$ and LiF at about 250° C., as measured by the DSC method, (see, N. Katayama et al., J. Power Sources, 2001, in press at time of application) and $PF_5$ reacts with solvents for further thermal decomposition, poly(siloxane-g-3 ethylene oxide) electrolyte has an exothermic peak above 300° C. This means that poly(siloxane-g-3 ethylene oxide) has excellent chemical stability even at an elevated temperature.

Figure 5B:
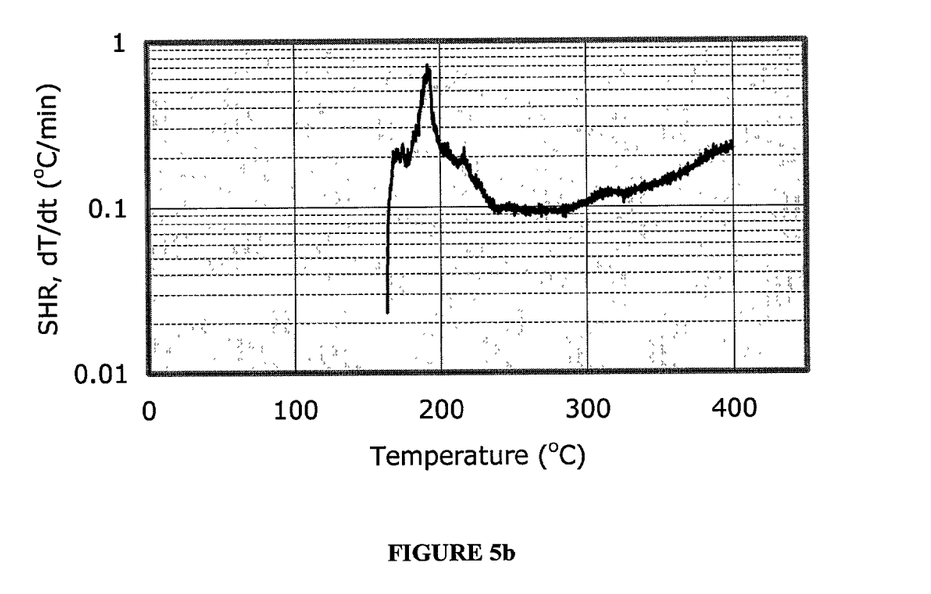
FIG. 5b is a comparative data trace from ARC tests of liquid electrolyte $LiPF_6$ in a mixture of ethylene carbonate and ethyl methyl carbonate.

FIG. 5b shows comparative data from an ARC test of a widely used liquid electrolyte, 1.2M LiPF$_6$ in ethylene carbonate (EC):ethyl methyl carbonate (EMC) (3:7 weight ratio). This sample was tested in the same way as in FIG. 5a. Its exothermic peak is detected before 200° C. (approximately 220° C. of onset temperature by DSC; see, N. Katayama et al., J. Power Sources, 2001, in press at time of application). It is thus found that the siloxane main backbone of poly(siloxane-g-ethylene oxide) significantly enhances the thermal stability of the electrolyte.

Figure 6:
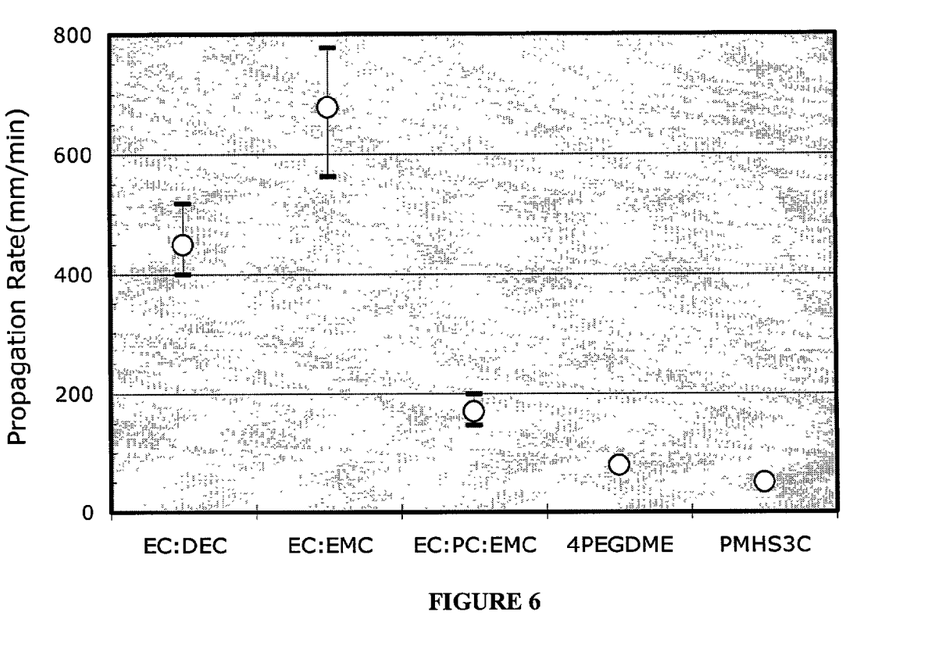
FIG. 6 is a graph of the results of comparative flame tests based on Underwriters Laboratories UL94 standard.

FIG. 6 is a graph of the results of a flame tests (propagation rate) based on Underwriters Laboratories UL94 standard. Flammability of poly(siloxane-g-3 ethylene oxide) electrolyte, doping level of 32:1 with LiPF$_6$, was investigated using modified UL-94HB Horizontal Burning Test. Detail compositions of the test samples are listed in Table 1.

TABLE 1

| | Composition | Other |
|---|---|---|
| EC:DEC | 1 M LiPF$_6$ in EC:DEC (1:1 by wt) | |
| EC:EMC | 1.2 M LiPF$_6$ in EC:EMC (3:7 by wt) | |
| EC:PC:EMC | 1 M LiPF$_6$ in EC:PC:EMC (3:3:4 by wt) | |
| 4PEGDME | Poly(ethylene glycol) dimethyl ether + LiPF$_6$ | 4 ethylene oxide O/Li$^+$ = 20:1 |
| PMHS3C | Poly(siloxane-g-3 ethylene oxide) + LiPF$_6$ | O/Li$^+$ = 32:1 |

UL intends this standard to serve as a preliminary indication of the acceptability of materials for use as part of electronic goods, lithium batteries, etc. with respect to flammability. The modified UL-94HB test uses a ¼"×5.5" silanized glass wool wick specimen soaked with the electrolyte samples held at one end in a horizontal position with marks at 1.00" and 4.94" from the free end. The specimen contains 5 g of electrolyte. A flame is applied to the free end for 30 seconds or until the flame front reaches the 1" mark. If combustion continues the duration is timed between the 1.00" mark and the 4.94" mark. If combustion stops before the 4.94" mark, the time of combustion and the damaged length between the two marks are recorded. A set of five specimens is tested. If two specimens from the set of five fail to comply, then a second set of five are tested. All five of this second set must comply. Propagation rate of flame is given by the following equation:

Propagation Rate=Distance (cm)/Elapsed time (min)

Poly(siloxane-g-3 ethylene oxide) electrolyte shows outstanding flame resistance. Its propagation rate is significantly lower than conventional liquid electrolyte for lithium ion batteries and low molecular weight polyethylene oxide electrolyte. This is because the inorganic siloxane backbone naturally acts as a combustion inhibitor.

It should be apparent that the present invention solves the long-felt need to create safe, high energy electrochemical storage devices having liquid electrolytes. Such devices promise to have high energy rate capabilities as well as high energy density. Batteries containing the present electrolyte, especially large batteries such as those used in electric vehicles, would be inherently safer than those with more volatile, flammable and unstable electrolytes.

Having described the present invention, it should be apparent to the reader that many variations of the present invention are possible without departure from the scope of the present invention. The specific implementations disclosed above are by way of example and for the purposes of enabling persons skilled in the art to implement the invention only. Accordingly, the invention is not to be limited except by the appended claims and legal equivalents.

We claim:
1. A battery, comprising:
an electrolyte that includes a poly(siloxane-g-ethylene oxide) with repeating units represented by general formula where PEO represents a poly(ethylene oxide) group having repeating units represented by and having a terminal oxygen linked directly to R", R represents an alkyl group, R' is a hydrogen or alkyl group, and R" is an alkyl group; and
at least one salt dissolved in the electrolyte.
2. The battery of claim 1, wherein an average molecular weight of the poly(siloxane-g-ethylene oxide) does not exceed 20,000 g/mol.
3. The battery of claim 1, wherein at least one salt is a lithium salt.
4. The battery of claim 1, wherein the dissolved salt includes at least one quaternary ammonium salt having an anion selected from the group consisting of: ClO$_4^-$, BF$_4^-$, AsF$_6^-$, PF$_6^-$, CF$_3$SO$_3^-$, (CF$_3$SO$_2$)$_2$N$^-$, (CF$_3$SO$_2$)$_3$C$^-$, (SO$_2$C$_2$F$_5$)$_2$N$^-$, PF$_3$(C$_2$F$_5$)$_3^-$, PF$_3$(CF$_3$)$_3^-$, and B(C$_2$O$_4$)$_2^-$.
5. The battery of claim 1, wherein the salt includes LiClO$_4$, LiBF$_4$, LiAsF$_6$, LiPF$_6$, LiCF$_3$SO$_3$, Li(CF$_3$SO$_2$)$_2$N, LiC(CF$_3$SO$_2$)$_3$, LiN(SO$_2$C$_2$F$_5$)$_2$, LiPF$_3$(C$_2$F$_5$)$_3$, LiPF$_3$(CF$_3$)$_3$, LiB(C$_2$O$_4$)$_2$, or mixtures thereof.
6. The battery of claim 1, wherein at least one salt is a lithium bis(chelato)borate having five to seven membered rings.
7. The battery of claim 1, wherein the electrolyte is nonvolatile.
8. The battery of claim 1, wherein the electrolyte has an ionic conductivity of at least 6×10$^{-4}$ S/cm at room temperature and at least 8.4×10$^{-4}$ S/cm at 37° C.
9. The battery of claim 1, wherein the battery is a secondary battery.
10. The battery of claim 1, further comprising:
a lithium metal oxide or lithium metal phosphate positive electrode, at least one porous separator, and at least one lithium-carbon, lithium-alloy, or lithium metal negative electrode.
11. The secondary battery of claim 9, wherein at least one salt is a lithium salt.
12. The battery of claim 1, wherein the dissolved salt includes LiCF$_3$SO$_3$.
13. The battery of claim 1, wherein the dissolved salt includes Li(CF$_3$SO$_2$)$_2$N.
14. The battery of claim 1, wherein the dissolved salt includes LiC(CF$_3$SO$_2$)$_3$.

15. The battery of claim 1, wherein the dissolved salt includes $LiN(SO_2C_2F_5)_2$.

16. The battery of claim 1, wherein the dissolved salt includes $LiPF_6$.

17. The battery of claim 1, wherein the dissolved salt includes $LiAsF_6$.

18. The battery of claim 1, wherein the dissolved salt includes $LiBF_4$.

19. The battery of claim 1, wherein the dissolved salt includes $LiClO_4$.

20. The electrochemical device of claim 9, wherein the dissolved salt includes at least one electrolyte salt from the following group: $LiClO_4$, $LiBF_4$, $LiAsF_6$, $LiPF_6$, $LiCF_3SO_3$, $Li(CF_3 SO_2)_2N$, $LiC(CF_3SO_2)_3$, $LiN(SO_2C_2F_5)_2$, $LiPF_3(C_2F_5)_3$, $LiPF_3(CF_3)_3$, $LiB(C_2O_4)_2$.

21. The battery of claim 1, wherein the dissolved salt includes $LiPF_3(C_2F_5)_3$.

22. The battery of claim 1, wherein the dissolved salt includes $LiPF_3(CF_3)_3$.

23. The battery of claim 1, wherein the dissolved salt includes $LiB(C_2O_4)_2$.

24. The battery of claim 1, wherein R' is an alkyl group.

* * * * *